(12) United States Patent
Matsumoto et al.

(10) Patent No.: US 6,591,804 B2
(45) Date of Patent: Jul. 15, 2003

(54) VARIABLE INTAKE APPARATUS FOR A MULTI-CYLINDER INTERNAL COMBUSTION ENGINE

(75) Inventors: Seiji Matsumoto, Saitama (JP); Yoshiyuki Umino, Saitama (JP); Tatsuya Sagano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/107,321

(22) Filed: Mar. 28, 2002

(65) Prior Publication Data

US 2002/0139340 A1 Oct. 3, 2002

(30) Foreign Application Priority Data

Mar. 30, 2001 (JP) .......................................... 2001-098191

(51) Int. Cl.⁷ ................................................ F02B 27/02
(52) U.S. Cl. ............................... 123/184.55; 123/184.56
(58) Field of Search ....................... 123/184.55, 184.24, 123/184.34, 185.42, 184.47

(56) References Cited

U.S. PATENT DOCUMENTS

| | | | | |
|---|---|---|---|---|
| 4,932,369 A | * | 6/1990 | Parr | 123/184.55 |
| 5,048,469 A | * | 9/1991 | Spray | 123/184.55 |
| 6,382,162 B2 | * | 5/2002 | Umino et al. | 123/184.55 |
| 6,446,591 B1 | * | 9/2002 | Chae et al. | 123/185.55 |

FOREIGN PATENT DOCUMENTS

JP 60-159334 8/1985

* cited by examiner

*Primary Examiner*—Marguerite McMahon
(74) *Attorney, Agent, or Firm*—Armstrong, Westrman & Hattori, LLP (57) ABSTRACT

In a variable intake apparatus for a multi-cylinder internal combustion engine, each cylinder is allowed to communicate with each other through air intake passageways including at least a pair of air intake passageway portions. Further, an air intake control valve integrally provided with a pair of valve bodies is disposed at an opening which is formed at a partition wall. The partition wall is formed between the intake air collecting chamber and the air intake passageway. Further more, the air intake control valve is actuated according to engine speeds of the internal combustion engine such that the air intake passageway portion is opened and closed by one of the valve bodies whereas the opening in the partition wall is opened and closed by the other of the valve bodies.

13 Claims, 7 Drawing Sheets

VARIABLE INTAKE APPARATUS FOR A MULTI-CYLINDER INTERNAL COMBUSTION ENGINE

BACKGROUND OF THE INVENTION

Field of the Invention

The present invention relates to an improved variable intake apparatus for a multi-cylinder internal combustion engine which can obtain a high intake air charging efficiency and a high output torque over a wide engine speed range of the internal combustion engine from low to high engine speed ranges.

Conventionally, various types of intake apparatuses have been proposed which are designed to make use of an intake air pressure-wave pulse generated in air intake passageways communicating with the respective cylinders of a multi-cylinder internal combustion engine, so as to obtain an extra charging effect by elevating the pressure at inlet ports of respective cylinders of the engine toward a latter half of an intake stroke in the respective cylinders.

For example, the length and/or volume of intake pipes is varied in response to the speed of an internal combustion engine so as to obtain an inertial supercharging effect and a resonance supercharging effect in supercharging intake air. With a suitable combination thereof, the intake air charging efficiency is highly maintained over a wide engine speed range from low to high engine speed ranges, whereby the output torque of the internal combustion engine is drastically improved.

In JP-A-63-159334, each cylinder of an intake apparatus has an air intake length switching means, and an air intake passageway area switching means respectively, so that the two switching means are selected according to the engine speeds.

In the intake apparatus, the construction of the intake apparatus is made complicated to disposed switching valves driven by the two switching means at required positions. Many components and high production costs are required because of the complicated construction of the intake apparatus.

SUMMARY OF THE INVENTION

It is an object of the invention to provide a simple and low-cost variable intake apparatus for a multi-cylinder internal combustion engine which can switch intake characteristics by a single air intake control valve.

In a first aspect of the invention, a variable intake apparatus for a multi-cylinder internal combustion engine including an air intake passageway 6 including a pair of air intake passageway portions communicating an intake air collecting chamber 5 with respective cylinders, an intake air control valve 20 integrally provided with a plurality valve members at an opening 11 formed in a partition wall, the partition wall being formed between the intake air collecting chamber 5, and the intake air control valve 20 controls to open and close the one of the air intake passageway portions 61, 62 with one of the valve bodies 25, 26, and to open and close the opening 11 with the other of the valve bodies 25, 26.

In the first aspect, the single air intake control valve, which integrally has two valve bodies, simultaneously controls the opening/closing of one of the pair of the intake air passages and the opening/closing of an opening portion of a partition wall between the other of the pair of the intake air passages and the air intake collecting chamber according to rotation speeds to drive the single air intake control valve, to thereby control an air intake length and an air intake area, whereby an intake air charging efficiency is highly maintained over a wide engine speed range from low to high engine speed ranges and an output torque of a multi-cylinder internal combustion engine is drastically improved.

Further more, the construction of the air intake control valve is thus simplified by adopting the construction in which the pairs of valve bodies are provided on the single air intake control valve, and this serves to reduce the number of components involved, thereby making it possible to reduce the production costs.

In the second aspect of the invention, the variable intake apparatus according to claim 1, wherein the intake air control valve 20 controls to open and form the one of the air intake passageway portions $6_1$, $6_2$ with the one of the valve bodies 25, 26 at the same time that the intake air control valve 20 controls to close the opening 11 and form the one of the air intake passageway portions $6_1$, $6_2$ with the other of the valve bodies 25, 26.

By opening the one induction passage while closing the opening in the partition wall the air intake passageway area may be wider and the air intake passageway length may be longer, whereby the output torque in particular in the middle engine speed range, can be improved. As this occurs, a turbulent flow can be generated in an induction air flow by the valve body which opens the one air intake passageway and the atomization of fuel is promoted by the turbulent flow to thereby improve the combustion efficiency.

According to a third aspect of the invention, the variable intake apparatus according to claim 1, wherein the air intake passageway portions $6_1$, $6_2$ are formed to cover the circumference of the intake air collecting chamber 5.

The entirety of the intake manifold 4 can be made compact to thereby attain the miniaturization of the intake manifold 4. In addition, because the air intake control valve is provided in the air intake passageway 6 covering the circumference of the intake air collecting chamber 5 and in the opening 11 in the bulkhead formed along the intake air collecting chamber 5, not only is the air intake passageway 6 allowed to communicate directly with the downstream side of the air intake passageway but also the one air intake passageway is allowed to function as an intake air collecting chamber 5 through the pair of valve bodies of the air intake control valve, whereby the air intake passageway length, air intake passageway area and volume of the intake air collecting chamber 5 can be controlled to be switched over through the simple construction.

PREFERRED EMBODIMENTS OF THE INVENTION

Referring to FIGS. 1 to 6, embodiments according to the invention will be described below.

Figure 1:
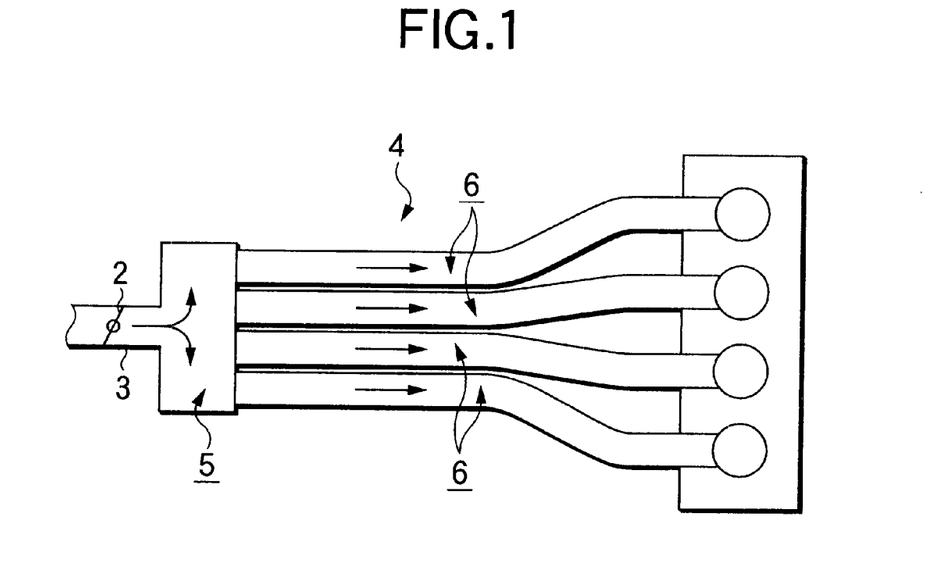
FIG. 1 is an explanatory view showing as a typical example a flow of intake air in an intake manifold according to a first embodiment of the present invention.

A variable air intake apparatus 1 (referred to FIG. 2) according to the embodiment is applied to an in-line four-cylinder internal combustion engine, and a intake-air flow in an intake manifold 4 thereof is described in FIG. 1.

An intake duct 3, which is provided with which a throttle body, incorporates a throttle valve 2, and communicates with an air cleaner (not shown) on an upstream side of the intake-air flow. Further, the intake duct 3 communicates with an air intake collecting chamber 5 of an intake manifold 4 on a downstream side of the intake-air flow. Four air intake passageways 6, which are independent from each other, extend from the air intake collecting chamber 5 to the four cylinders in parallel with each other.

Consequently, an intake air induced into the intake duct 3 via the air cleaner and the throttle valve 2 flows into the air intake collecting chamber 5 of a relatively large volume. Then, the intake air is separately supplied into the four mutually independent air intake passageways 6.

Figure 2:
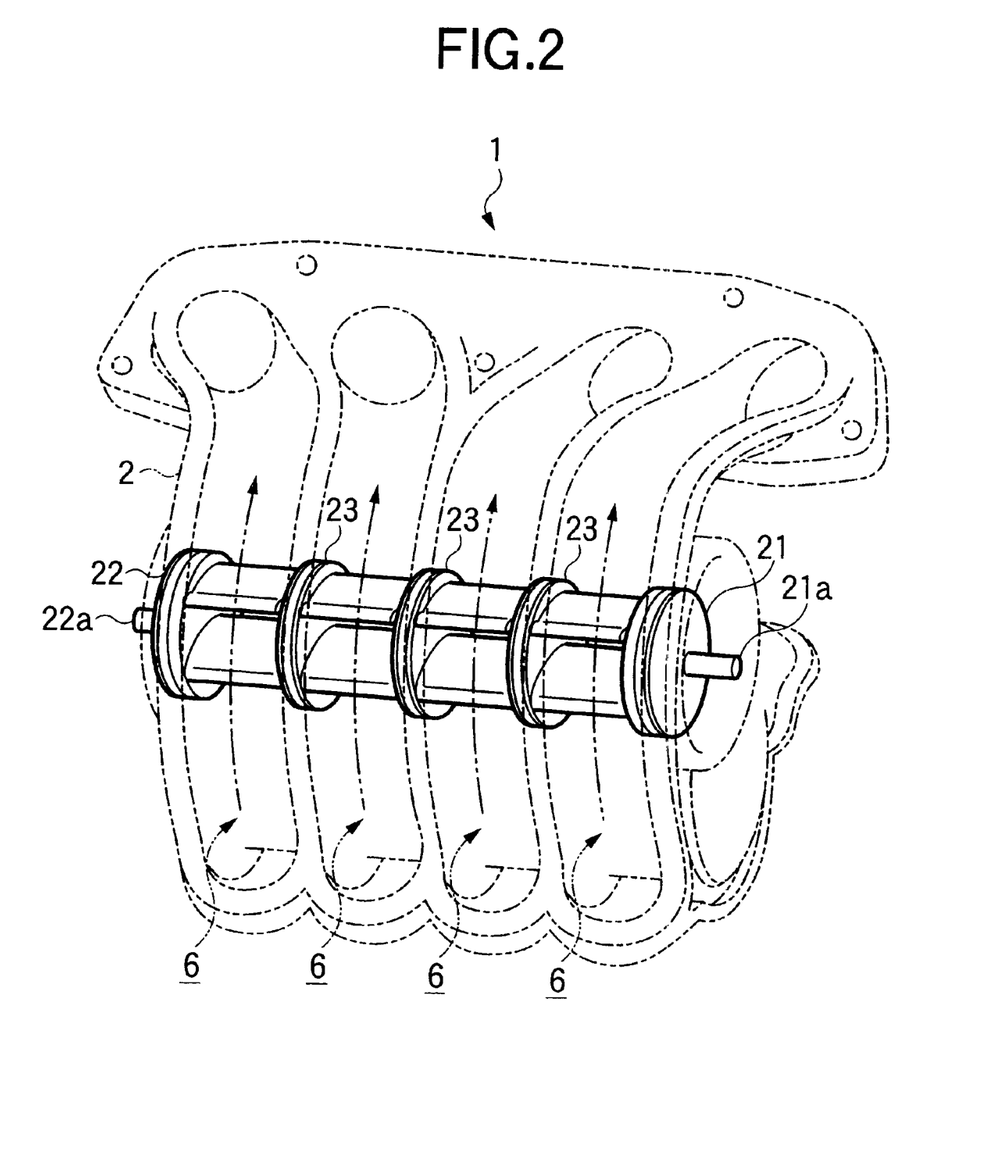
FIG. 2 is a perspective view showing an air intake control valve with the intake manifold illustrated in imaginary lines.
Figure 3:
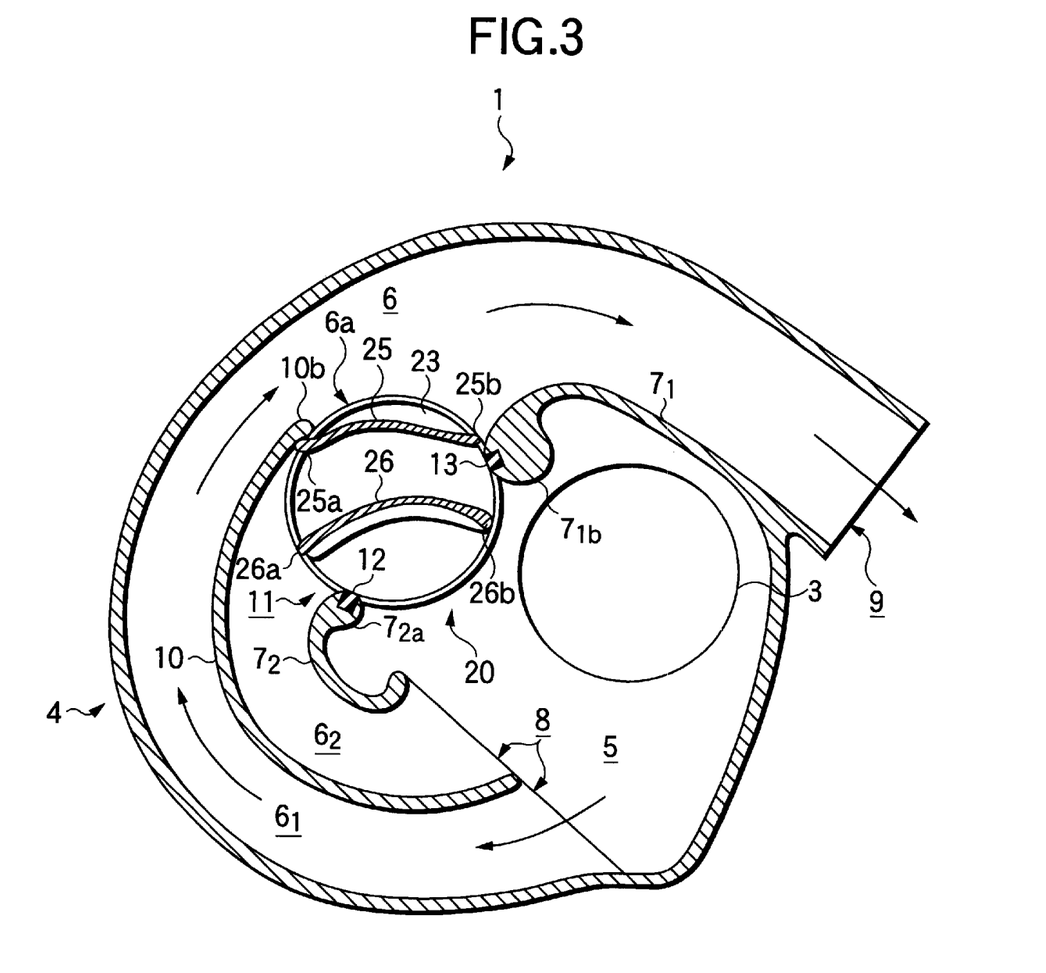
FIG. 3 is a sectional view showing conditions of the intake manifold and the air intake control valve in a low engine speed range.

As shown in FIGS. 2 and 3, in the air intake manifold 4 of the variable air intake apparatus 1, the intake air collecting chamber 5 is constructed in an elongated cylindrical space which extends in a direction in which the cylinders are arranged, and the four air intake passageways 6 are constructed to surround the intake air collecting chamber 5 in such a manner as to be wound around the intake air collecting chamber 5 along about three-fourths of the circumference thereof. The intake duct 3 opens to one of end walls of the elongated intake air collecting chamber 5 at a downstream end of the air flow.

In FIG. 3, an inner circumferential wall of the air intake passageway 6, which is circumferentially provided around the intake air collecting chamber 5, forms a partition wall 7 between the air intake passageway 6 and the intake air collecting chamber 5. Further, four openings are formed in a lower part of the intake air collecting chamber 5 in such a manner as to be arranged in parallel in the longitudinal direction of the same chamber. The four openings constitute entrances 8 to the respective air intake passageways 6. In addition, the air intake passageways 6 have exits 9 (entrances to the cylinders) diagonally above the intake air collecting chamber 5 at the end of their clockwise circumferential extension around three-fourths the circumference of the same chamber.

The air intake passageways 6 which curve in an arc-like fashion around the intake air collecting chamber 5 are each divided into an outer circumferential side main air intake passageway $6_1$ and an inner circumferential auxiliary air intake passageway $6_2$ by a partition wall 10 at an upstream-half portion thereof so as to form a pair of intake air passageway portions.

Then, an opening 11 is formed substantially at a central portion in a partition wall 7 which separates the intake air collecting chambers from the air intake passageway 6. The partition wall 7 is divided into an upstream side partition wall $7_2$ and a downstream side partition wall $7_1$ by forming the opening 11 therein.

Further, an air intake control valve 20 is fittingly and rotatably inserted in the intake apparatus in such a manner as to be brought into internal contact with three end edges such as an downstream side end edge $7_{2a}$ of the partition wall $7_2$ and a upstream side end edge $7_{1b}$ of the partition wall $7_1$ and a downstream side end edge 10b of the partition wall 10.

An elongated groove is formed in the upstream side end edge 11a and the downstream side end edge 11b respectively in such a manner as to be directed in a direction in which the air intake passageways 6 are arranged. Then, seal members 12 and 13 are engaged with the elongated grooves, respectively, whereby the air intake control valve 20 is designed to closely contact the seal members 12, 13.

As shown in FIG. 2, the air intake control valve 20 is a rotary valve. Three disk-like partition plates 23 of the air intake control valve 20 are coaxially arranged at regular intervals between disk-like side plates 21 and 22 disposed at ends of the air intake control valve 20. Further, two valve bodies 25, 26 are provided between the side plate 21 and the partition plate 23, the partition plates 23, and the partition plate 23 and the side plate 22, to thereby couple the two valve bodies, whereby the intake air control valve 20 is integrally provided with the disk-like partition wall 23.

All the disk-like partition plates 23 and side plates 21, 22 have the same predetermined diameter. As shown in FIG. 3, the two valve bodies 25, 26 approximately curve in parallel to each other. The valve body 25 is located apart from the rotational center of the intake air control valve 20. Further, the valve body 25 has end portions 25a, 25b which curve upwardly in opposition to the central curvature of the valve body 25. The end portions 25a, 25b protrude slightly from the outer circumference of the plates 21, 22, and 23 of the intake air control valve 20 which have the predetermined diameter.

A curved central portion of the valve body 26 is located in the vicinity of the rotational center of the intake air control valve 20. Further, the valve body 26 has end portions 26a, 26b which are located at positions at which the end portions are brought into contact with the outer circumference of the partition plates 23, and the side plates 21, 22. The end portions 26a, 26b do not protrude from the outer circumference of the partition plates 23.

The contour as described above is mounted when the cylindrical air intake control valve 20 is inserted in the intake manifold 4 in an axial direction thereof.

An arc-like notch 6a having the same diameter as that of the disk-like partition plate 23 is formed in respective partition walls which separate the four air intake passageways 6 from one another in such a manner as to extend in the order of two-third the circumference of the respective partition walls until the notch reaches the opening 11 formed in the partition wall 7, and the air intake control valve 20 having the cylindrical contour is fittingly inserted to match the notches 6a of the air intake passageways 6.

When the air intake control valve 20 is fittingly inserted into the intake manifold 4 to contact the notches 6a, the end portions 25a and 25b of the valve body 25 are touched to circumferential edges of the notches 6a. Consequently, it is difficult to insert the air intake control valve 20 into the intake manifold 4.

Therefore, when the air intake control valve 20 is fittingly inserted into the intake manifold 4, the elongated grooves into which the seal members 12, 13 at the end edge $7_{2a}$ and the end edges $7_{2b}$ may be used. The air intake control valve 20 can be fittingly inserted into the intake manifold 4 in such a manner that the end portions 25a, 25b of the valve bodies 25 are inserted into the elongated grooves.

A slight extra space is provided between the air intake control valve 20 and the arc-like notches before the seal members 12, 13 are fitted in the elongated grooves. And then, the air intake control valve 20 can be rotated in a predetermined angle range when the air intake control valve 20 has been inserted to a predetermined position in the longitudinal direction thereof. The seal members 12, 13 are fitted into the elongated grooves, after the air intake control valve be rotated.

Thus, when the air intake control valve 20 is inserted into the intake manifold 4 as has been described above, the respective partition walls 23 are allowed to rotatably fit in the notches 6a. Thus, the four air intake passageways 6 which are provided in parallel to each other are partitioned by the respective partition walls 23. Further, the side walls 21, 22 rotatably fit on side walls of the intake manifold 4.

Figure 4:
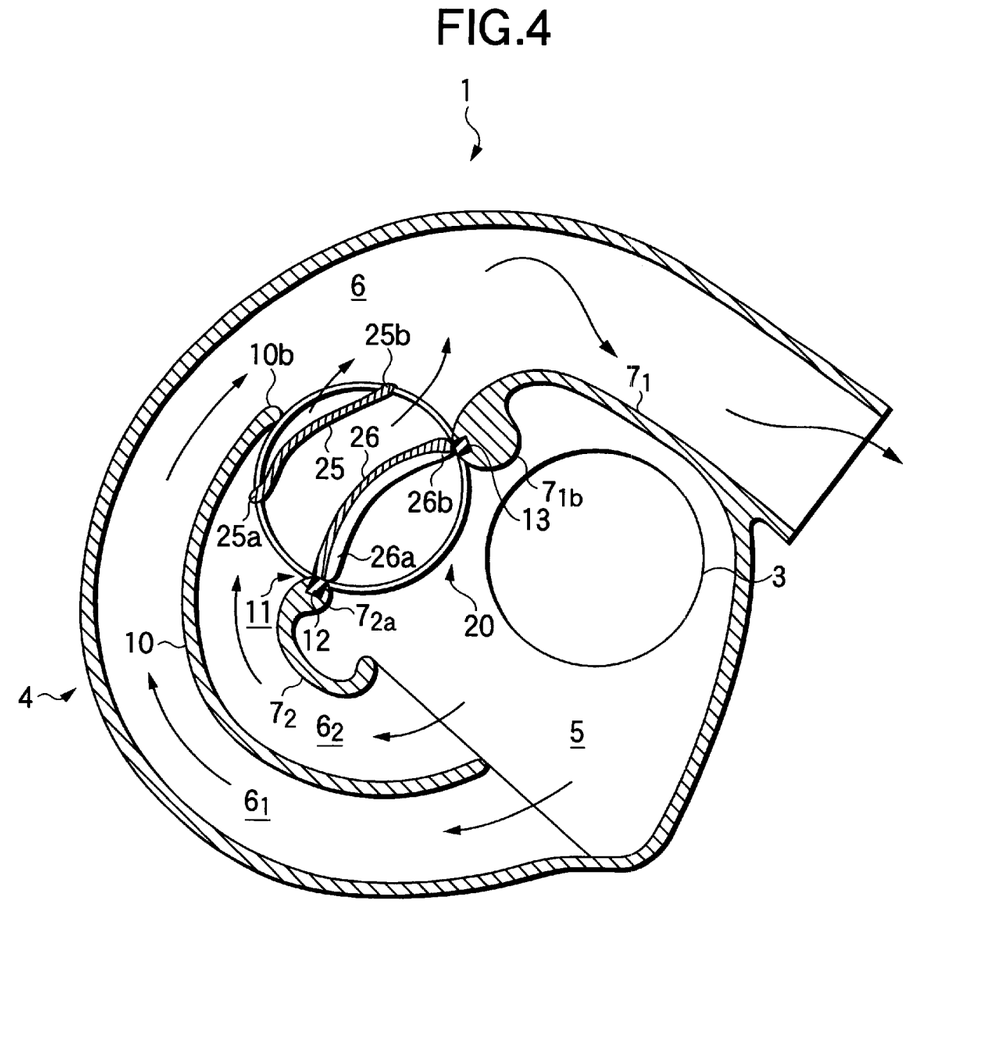
FIG. 4 is a sectional view showing conditions of the intake manifold and the air intake control valve in a middle engine speed range.
Figure 5:
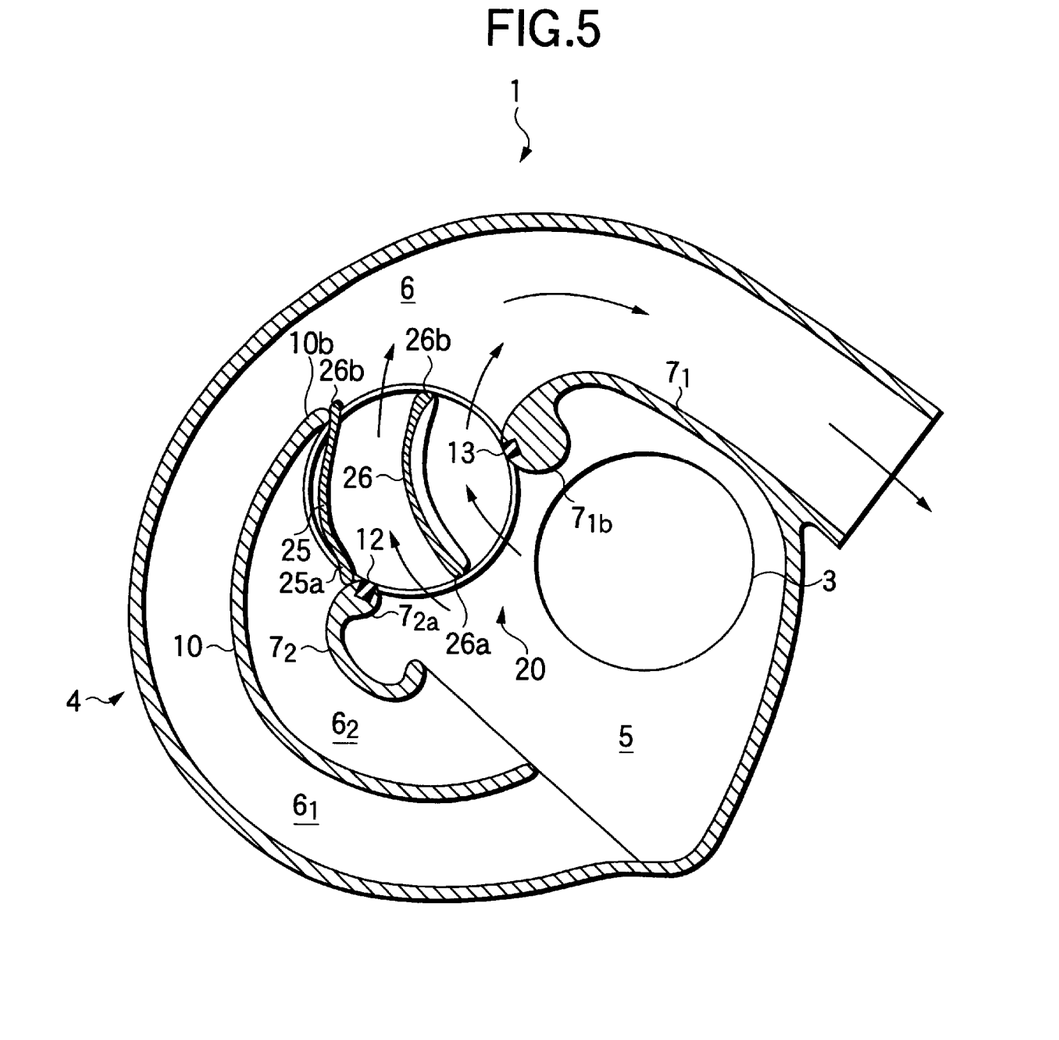
FIG. 5 is a sectional view showing conditions of the intake manifold 4 and the air intake control valve in a high engine speed range.

Consequently, as shown in FIGS. 3 to 5, the air intake control valve 20 can rotate back and forth from a first position (refer to FIG. 3) where the end portion 25a abuts with the end edge 10b of the partition wall 10 at the same time that the end portion 25b abuts with the end edge $7_{1b}$, to a second position where the end portion 25a abuts with the end edge $7_{2a}$ at the same time that the end portion 25b abuts with the end edge 10b of the partition wall 10.

A rotating shaft 21a which protrudes from the side wall 21 is driven to rotate by a motor-driven actuator or a negative-pressure actuator to thereby rotate the air intake control valve 20. In addition, an angle sensor is attached to a rotating shaft 22a protruding from a center of the side wall 22 so that the rotational angle of the air intake control valve 20 is fed back to drive the actuator for controlling the rotational angle of the air intake control valve 20.

The engine speed of the internal combustion engine is separately detected by an engine speed sensor, and an electronic control unit(ECU) sets a target value for the rotational angle of the air intake control valve 20 based on the detected engine speed (the engine speed of the engine), whereby the actuator for controlling the rotational angle of the intake control valve 20 is driven.

The variable intake apparatus 1 according to the first embodiment is constructed as has been described heretofore. When the engine speed of the internal combustion engine is in a low engine speed range, as shown in FIG. 3, the air intake control valve 20 of the variable intake apparatus 1 is set to be in the first position where the end portion 25a abuts with the end edge 10b of the partition wall 10 at the same time that the end portion 25b abuts with the end edge $7_{1b}$.

Consequently, when the valve body 25 closes an opening 11 between the end edge 10b of the partition wall 10 and the end edge $7_{1b}$, only the main air intake passageway $6_1$ is allowed to communicate with the intake air collecting chamber 5. Therefore, an effective air intake passageway 6 is so formed as to have a long air intake passageway length and a small air intake passageway area.

Since the valve body 26 closes neither opening 11 nor the air intake sub-passageway $6_2$, the exits of the air intake sub-passageway $6_2$ are allowed to communicate with the intake air collecting chamber 5. Therefore, the volume of the intake air collecting chamber 5 including the air intake sub-passageway 6 substantially increases, whereby the reversing function of intake air pressure-wave pulse in the intake air collecting chamber 5 is drastically increased.

Consequently, when the internal combustion engine is in its low engine speed range, the intake air pressure-wave pulse with a low inherent frequency which is generated in the effective air intake passageway 6 are tuned with a long open/close cycle of an air intake inlet valve based on low engine speeds of the internal combustion engine. Therefore, a high inertial extra charging effect is obtained in every cylinder, thereby the output torque (refer to a portion indicated by ① in FIG. 6) can be drastically improved.

Figure 6:
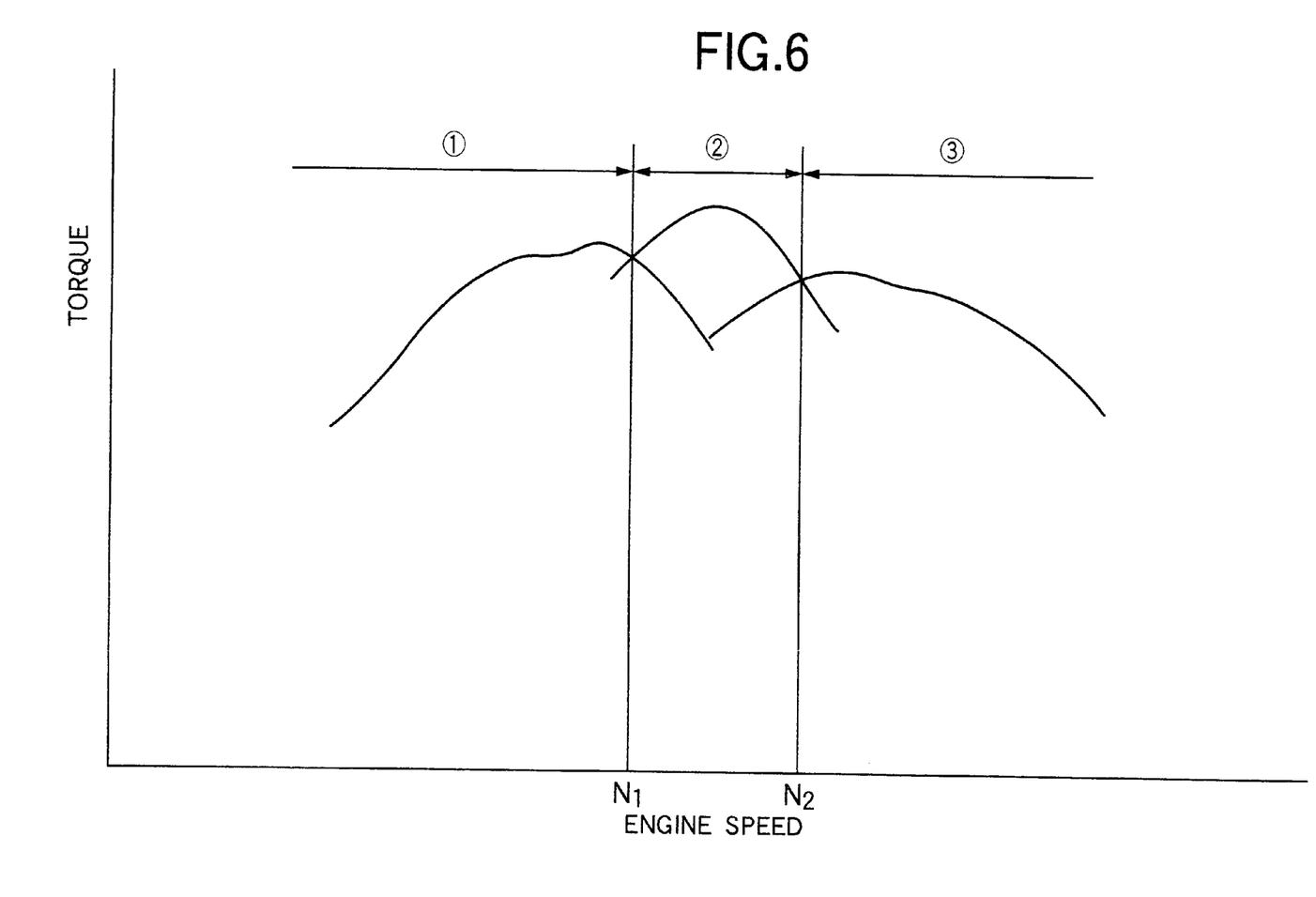
FIG. 6 is a characteristics diagram showing variations in output torque relative to engine speeds in a variable intake apparatus according to the present invention.

The increase of the reversing function of the intake air pressure-wave pulse in the intake air collecting chamber 5 further promotes an inertial extra charging effect to thereby improve further the output torque. Changes in output torque relative to engine speeds are shown in FIG. 6. In FIG. 6, the engine speed in the low engine speed range indicated by ① is not more than $N_1$.

When the engine speed of the internal combustion engine increases, the engine speed is in a middle engine speed range, the air intake control valve 20 is rotated to be set at a rotational position shown in FIG. 4. Namely, the end portions 26a and 26b of the valve body 26 are brought into contact with the seal members 12, 13 fitted in the elongated grooves in the end edges $7_{2a}$ and the end edges $7_{1b}$, respectively, whereby the opening 11 are closed by the valve body 26.

At the same time, the valve bodies 25 and 26 forms the air intake sub-passageways $6_2$ and the valve body 25 extends along the partition wall 10 as shown in FIG. 4 therefore, air flows smoothly. Consequently, the two air intake passageways, such as the main air intake passageway $6_1$ and the air intake sub-passageway 62, are allowed to communicate with each other, whereby an effective air intake passageway is formed which has a long air intake passageway length and a large air intake passageway area.

Consequently, when the internal combustion engine is in the middle engine speed range, the intake air pressure-wave pulse with a inherent frequency which is generated in the effective air intake passageway are tuned with a long open/close cycle of the air intake valve based on middle engine speeds of the internal combustion engine. Therefore, a high inertial extra charging effect is obtained in every cylinder, thereby the output torque (refer to a portion indicated by ② in FIG. 6) can be drastically improved.

Furthermore, as shown in FIG. 4, an air from the air intake sub-passageway $6_2$ turbulently flows into the outer air intake passageway $6_1$ at a certain angle with respect to an air flow in the outer air intake passageway $6_1$, since the end portion 25b extending along the partition wall 10 slightly curves upwardly in opposition to the central curvature of the valve body 25. Consequently, a turbulent flow is generated in the outer air intake passageway $6_1$ by the air from the air intake sub-passageway $6_2$ to thereby promote the atomization of fuel injected from a injector which is provided on a down stream side of the air intake passageway 6. Therefore, the combustion efficiency may be increased and the out put torque is improved. In FIG. 6, the engine speed in the middle engine speed range ② is within a range which is not smaller than N1 but not larger than N2.

Then, when the engine speed of the internal combustion engine increases in a high engine speed range, the air intake control valve 20 is rotated so as to be set at a rotational position as shown in FIG. 5, when the end portions 25a, 25b of the valve body 25 are brought into contact with the end edge $7_{2a}$ and the end edge 10b of the partition wall 10, respectively, the air intake sub-passageway $6_2$ is closed by the valve body 25 at the same time that the valve body 26 opens the opening 11 to form a passage which allows intake air to flow directly and smoothly from the intake air collecting chamber 5 into a downstream side of the air intake passageway 6.

While the main air intake passageway $6_1$ is in communication with the intake air collecting chamber 5, most of the intake air directly flows from the intake air collecting chamber 5 into the downstream side of the air intake passageway 6 via the opening 11. Therefore, an effective air intake passageway is formed which has a short air intake passageway length and a wide air intake passageway area.

Consequently, when the internal combustion engine is in the high engine speed range, the intake air pressure-wave pulse with a inherent high frequency which is generated in the effective air intake passageway are tuned with a long open/close cycle of the air intake valve based on high engine speeds of the internal combustion engine. Therefore, a high inertial extra charging effect is obtained in every cylinder, thereby the output torque (refer to a portion indicated by ③ in FIG. 6) can be drastically improved. In FIG. 6, the engine speed in the high engine speed range indicated by ③ is not more than $N_1$.

Thus, as has been described heretofore, according to the variable intake apparatus of the embodiment, the air intake control valve 20 is switched over in three stages according to the ending speeds of the internal combustion engine in order to control the rotating angle thereof, whereby a flat and high output torque can be obtained over the wide engine speed range from the low engine speeds to the high engine speeds of the internal combustion engine with the high intake air charging efficiency as shown in FIG. 6.

In general, when comparing inertial extra charging effect with resonance extra charging effect, the inertial extra charging effect is greater than the resonance extra charging effect with respect to the intake air efficiency. In the variable intake apparatus of the invention, since the high intake air charging efficiency is obtained at all the engine speeds over the low, middle, and high engine speeds by the inertial extra charging effect, a higher output torque can be obtained over the wide engine speed range.

The variable intake apparatus of the invention provides a simple construction in which the single air intake control valve 20 with the pairs of valve bodies 25, 26 has a limited number of components, whereby the production costs can be reduced. Because the air intake passageways 6 are formed in such a manner as to cover the circumference of the intake air collecting chamber 5, the entirety of the intake manifold 4 is made more compact, whereby the miniaturization of the intake manifold 4 can thus be attained.

While the air intake control valve 20 according to the embodiment is a rotary valve as shown in FIG. 2, the same effect may be obtained if a pair of valve bodies are integrally formed for each air intake passageway. Therefore, a butterfly valve as shown in FIG. 7 may be contemplated.

Figure 7:
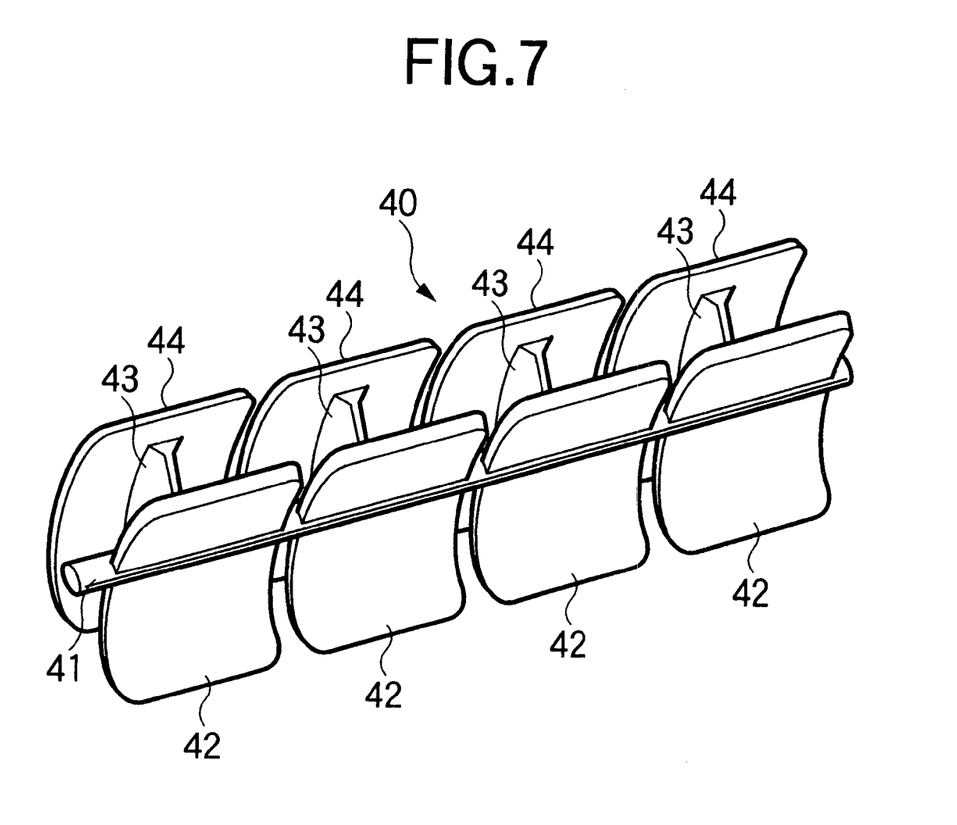
FIG. 7 is a perspective view of an air intake control valve according to a second embodiment of the present invention.

As shown in FIG. 7, in an air intake control valve 40, four curved plate-like valve bodies 42 are arranged on a rotating center shaft 41 at certain intervals by coupling them together at central portions thereof, and curved plate-like valve bodies 44 are integrally formed at distal ends of arm portions 43 extending radically from the back sides of the respective valve bodies 42, respectively.

The valve body 42 and valve body 44 correspond to the valve body 26 and valve body 25 of the air intake control valve 20, respectively. While the basic construction of an intake manifold 4 accommodating the air intake control valve 40 is substantially as same as that of the intake manifold 4 of the embodiment, since the rotating center shaft 41 is rotatably supported on partition walls 7 which separate the four air intake passageways from one another, the intake manifold 4 is used which is divided into a plurality of induction passages by dividing surfaces which pass through the rotating center shaft.

The same function and effectiveness as those obtained with the air intake control valve 20 according to the previous embodiment can be obtained with the butterfly valve-type air intake control valve 40 as has just been described above.

What is claimed is:

1. A variable intake apparatus for a multi-cylinder internal combustion engine including an intake manifold, said apparatus comprising:

an intake air collecting chamber;

an air intake passageway including a pair of air intake passageway portions communicating the intake air collecting chamber with respective cylinders;

a first partition wall, which has an opening, provided between the intake air collecting chamber and one of the air intake passageway portions; and an intake air control valve integrally providing a plurality of valve bodies disposed in the opening, wherein the intake air control valve controls to open and close said one of the air intake passageway portions with one of the valve bodies, and to open and close the opening in the first partition wall with the other of the valve bodies; and wherein said pair of air intake passageway portions include an outer circumferential side main air intake passageway and an inner circumferential side main air intake passageway.

2. The variable intake apparatus according to claim 1, wherein the intake air control valve controls to open and form said one of the pair of air intake passageway portions with one of the valve bodies at the same time that the intake air control valve controls to close the opening in the first partition wall with the other one of the valve bodies.

3. The variable intake apparatus according to claim 1, wherein the air intake passageway portions cover the circumference of the intake air collecting chamber.

4. The variable intake apparatus according to claim 3, wherein the air intake passageway extends in such a manner as to be wound around about three-fourths of the circumference of the intake air collecting chamber.

5. The variable intake apparatus according to claim 4, wherein the intake air passageway includes a second partition wall at an upstream-half portion of the intake air passageway, and the second partition wall has a downstream side end edge thereof.

6. The variable intake apparatus according to claim 5, wherein the first partition wall has an upstream side partition wall and a downstream side partition wall, and the air intake control valve is rotatably and fittingly inserted in such a manner as to internally contact three end edges such as a downstream side end edge of the upstream side partition wall, an upstream side end edge of the downstream side partition wall, and a downstream side end edge of the second partition wall.

7. The variable intake apparatus according to claim 6, wherein an elongated groove is formed in the end edge and the end edge, respectively, in such a manner as to extend in a direction in which the passageways are arranged, seal members are fitted in the elongated grooves, respectively, and the air intake control valve is brought into contact with the seal members.

8. The variable intake apparatus according to claim 1, wherein partition plates are coaxially arranged on the air intake control valve at regular intervals between side plates and the pairs of valve bodies are disposed between the side plate and the partition plate between the side plate and the partition plate and between the partition plates together to form an integral construction.

9. The variable intake apparatus according to claim 8, wherein the partition plate and the side plate are formed into a disk-like configuration, and the partition plates and the side plates have a same diameter.

10. The variable intake apparatus according to claim 9, wherein the pair of the valve bodies substantially curves in parallel to each other, the valve body is located apart from a rotational center of the air intake control valve with end portions thereof being formed to curve upwardly in opposition to a central curvature of the valve body, and the end portions protrude slightly from an outer circumference of the partition plate.

11. The variable intake apparatus according to claim 10, wherein an elongated groove is formed in the end edge and the end edge, respectively, in such a manner as to extend in a direction in which the air intake passageways are arranged, and the air intake control valve is fittingly inserted in such a manner that the end portions are inserted in the elongated grooves, respectively.

12. The variable intake apparatus according to claim 11, wherein the seal members are fitted in the both elongated grooves.

13. The variable intake apparatus according to claim 9, wherein the air intake control valve is formed into a cylindrical configuration, and the air intake control valve is attached and inserted in an intake manifold in an axial direction thereof from a side of the intake manifold.

* * * * *